United States Patent
Gillespie et al.

(10) Patent No.: US 9,378,156 B2
(45) Date of Patent: Jun. 28, 2016

(54) INFORMATION HANDLING SYSTEM SECRET PROTECTION ACROSS MULTIPLE MEMORY DEVICES

(71) Applicant: Dell Products L.P., Round Rock, TX (US)

(72) Inventors: Kurt D. Gillespie, Pflugerville, TX (US); Jonathan B. Barkelew, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 40 days.

(21) Appl. No.: 14/505,775

(22) Filed: Oct. 3, 2014

(65) Prior Publication Data

US 2016/0098360 A1 Apr. 7, 2016

(51) Int. Cl.
- *G06F 12/14* (2006.01)
- *G06F 21/79* (2013.01)

(52) U.S. Cl.
CPC ........ *G06F 12/1433* (2013.01); *G06F 12/1408* (2013.01); *G06F 21/79* (2013.01); *G06F 2212/1052* (2013.01); *G06F 2212/2028* (2013.01); *G06F 2212/2532* (2013.01)

(58) Field of Classification Search
CPC . G06F 12/14; G06F 12/1408; G06F 12/1433; G06F 21/79; G06F 21/88
See application file for complete search history.

(56) References Cited

U.S. PATENT DOCUMENTS

| | | | | |
|---|---|---|---|---|
| 8,331,189 B1* | 12/2012 | Pancoast | ................. | G06F 21/79 365/149 |
| 2003/0188179 A1* | 10/2003 | Challener | ............... | G06F 21/57 713/193 |
| 2008/0028168 A1* | 1/2008 | Muraoka | ............. | G06F 12/1416 711/159 |
| 2008/0065905 A1* | 3/2008 | Salessi | .................... | G06F 21/31 713/193 |
| 2009/0182965 A1* | 7/2009 | Norman | .................... | G11C 7/24 711/163 |
| 2012/0017097 A1* | 1/2012 | Walrath | ................ | G06F 21/602 713/190 |
| 2013/0219166 A1* | 8/2013 | Ristov | ................. | H04L 63/0853 713/151 |
| 2015/0121537 A1* | 4/2015 | Ellis | ........................ | G06F 21/60 726/26 |

* cited by examiner

*Primary Examiner* — Hal Schnee

(74) *Attorney, Agent, or Firm* — Terrile, Cannatti, Chambers & Holland, LLP; Robert W. Holland

(57) ABSTRACT

Information handling system secret protection is enhanced by encrypting secrets into a common file and breaking up the encrypted file into plural portions stored at plural memory devices, such as across plural DIMMs disposed in the information handling system. In one embodiment, a decryption key to decrypt the encrypted file is broken into plural portions stored at the plural memory devices. Upon detection of a predetermined security factor, such as an indication of removal of a the encrypted file is removed from the plural portions.

15 Claims, 3 Drawing Sheets

INFORMATION HANDLING SYSTEM SECRET PROTECTION ACROSS MULTIPLE MEMORY DEVICES

BACKGROUND OF THE INVENTION

1. Field of the Invention

The present invention relates in general to the field of information handling system security, and more particularly to information handling system secret protection across multiple memory devices.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often store sensitive information, sometimes using complex encryption methods. One weakness with the use of encryption is that exposure of an encryption key allows an unauthorized user to access encrypted information. Another weakness is that information typically is decrypted when used and thus accessible to unauthorized users when stored in memory in a decrypted form. Generally, security measures at information handling systems, such as anti-malware and firewall applications, will protect against attacks against an information handling system that is running and executing security measures. When the information handling systems are powered down, information stored in persistent memory with an adequately-secure password will withstand substantial efforts to break the password. Thus, even if an information handling system is physically stolen, encrypted information stored in persistent memory is relatively safe from unauthorized access.

Certain attack vectors allow retrieval of secrets from information handling system memory by interfacing with random access memory (RAM) before power is removed from the RAM. Often RAM stores sensitive information, such as passwords, account numbers, and personal information, in unencrypted form for use by the processor and operating system while the system is running. RAM is generally considered non-persistent memory in that information stored in RAM is lost when power is removed from the information handling system. In fact, RAM persists information for brief periods of time without power and maintains information for longer periods of time by applying power to periodically refresh the memory, the method most commonly used to put a consumer computer "to sleep." The length of time that RAM persists information without power depends upon a number of factors including the amount of power applied at each refresh and the temperature of the RAM.

If an unauthorized person obtains physical access to an information handling system while RAM has power, the unauthorized person can retrieve data from the RAM by moving the RAM to a different information handling system for access. For example, if an end user leaves an information handling in the S3 sleep mode, commonly known to a user as putting a computer "to sleep," then the RAM remains powered on for a quick system restart. An unauthorized person who obtains physical control of the information handling system in the S3 sleep mode opens the housing, removes the RAM and places the RAM in another information handling system while information stored in the RAM persists. Once the RAM has power in the new information handling system, the contents stored in the S3 mode can be retrieved at the attacker's leisure.

One technique for prolonging the time that RAM persists information is to place an information handling system in a cold space, such as a freezer, while the information handling system is in S3 power saving mode. The reduced temperature will often prolong the retention of information in RAM for greater than a minute. Other malicious or data compromising attacks are known and described in Wikipedia and other sources. Various countermeasures are also available, such as encryption of data in RAM. However, if a user does not properly protect a system with operating system and/or pre-boot passwords, a successful attack can allow an attacker to read all contents of memory, including SMRAM/SMM protected memory that is normally unreadable during runtime (aka, "not asleep") when the system is properly initialized. Since information extracted from RAM can include passwords, cryptographic keys and sensitive personal information, a successful attack can lead to extended vulnerabilities that include hard drive and network hacks.

SUMMARY OF THE INVENTION

Therefore a need has arisen for a system and method which prevents unauthorized access to information stored in memory that is removed and placed in an unauthorized information handling system.

In accordance with the present invention, a system and method are provided which substantially reduce the disadvantages and problems associated with previous methods and systems that protect information stored in memory of an information handling system. Sensitive information is located in plural physical memory devices of an information handling system and deleted upon detection of an indication of an unauthorized physical access to the information handling system. Dispersing encrypted information across plural memory devices allows deletion of the encrypted information from the 2nd through Nth memory device if an unauthorized physical access is attempted at one of the memory devices, thus reducing the risk of unauthorized exposure of sensitive information.

More specifically, an information handling system processes information stored in random access memory (RAM) with instructions executing on a CPU or other processor. Sensitive information otherwise stored in encrypted form is decrypted for use by the CPU and stored in RAM dual in-line memory modules (DIMMs). To prevent unauthorized access if the information handling system has physical security compromised while the sensitive information is stored in RAM, a security module breaks the sensitive information into files or other defined portions and disperses the portions across plural different physical memory devices. Upon detection of an indication of an unauthorized attempt at physical access to information stored on a DIMM, portions of the sensitive information at the DIMMs that are still connected to the system are deleted so that a complete copy of the sensitive information is unavailable as a whole. In one embodiment, the sensitive information is stored as an encrypted blob distributed in portions to plural DIMMs, and the key to decrypt the blob is also broken into portions and distributed to the plural DIMMs. Indications of an attempt at unauthorized access to a DIMM include a detection of a reduced temperature, an electrical condition detected at the DIMM bus, and a mechanical detection device that detects removal of a DIMM or opening of a chassis so that access to the DIMMs becomes available.

The present invention provides a number of important technical advantages. One example of an important technical advantage is that sensitive information stored in memory at an information handling system is divided between multiple memory devices so that unauthorized removal of one of the memory devices initiates cleansing of the related information from the other memory devices. For example, splitting portions of sensitive information between two or more DIMMs of an information handling system reduces the risk that unauthorized removal of one MAIM will yield the sensitive information in a usable form since the other DIMMs may be cleansed upon detection of removal of the first DIMM. Further, if a key needed to decrypt and use sensitive information is itself split between memory devices, then an unauthorized access has even less opportunity to obtain information of value. The extra protection provided by dispersing encrypted information and keys across multiple memory devices helps to reduce information handling system vulnerability to cold boot attacks on systems that have had physical security compromised.

If 4 DIMMs are present in the system, and only one DIMM is compromised by it being removed, whereby the removal of it triggered the cleansing of the 3 remaining, the secret being protected has only revealed a fourth of its data. If the data was a password, there would still be a significant effort to brute-force the remaining ¾ths of the password. If the secret was encrypted, as previously described, the first fourth of data would only reveal a fourth of an encrypted block of data, and the first fourth of an encryption secret, leaving the compromised data as almost unusable, as the computational effort to brute-force the remaining parts of both as a greater effort than just guessing the password with no additional compromised data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Sensitive information stored on an information handling system is protected from disclosure in the event of unauthorized physical access to the information handling system by dispersing the sensitive information across plural physical memory devices. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
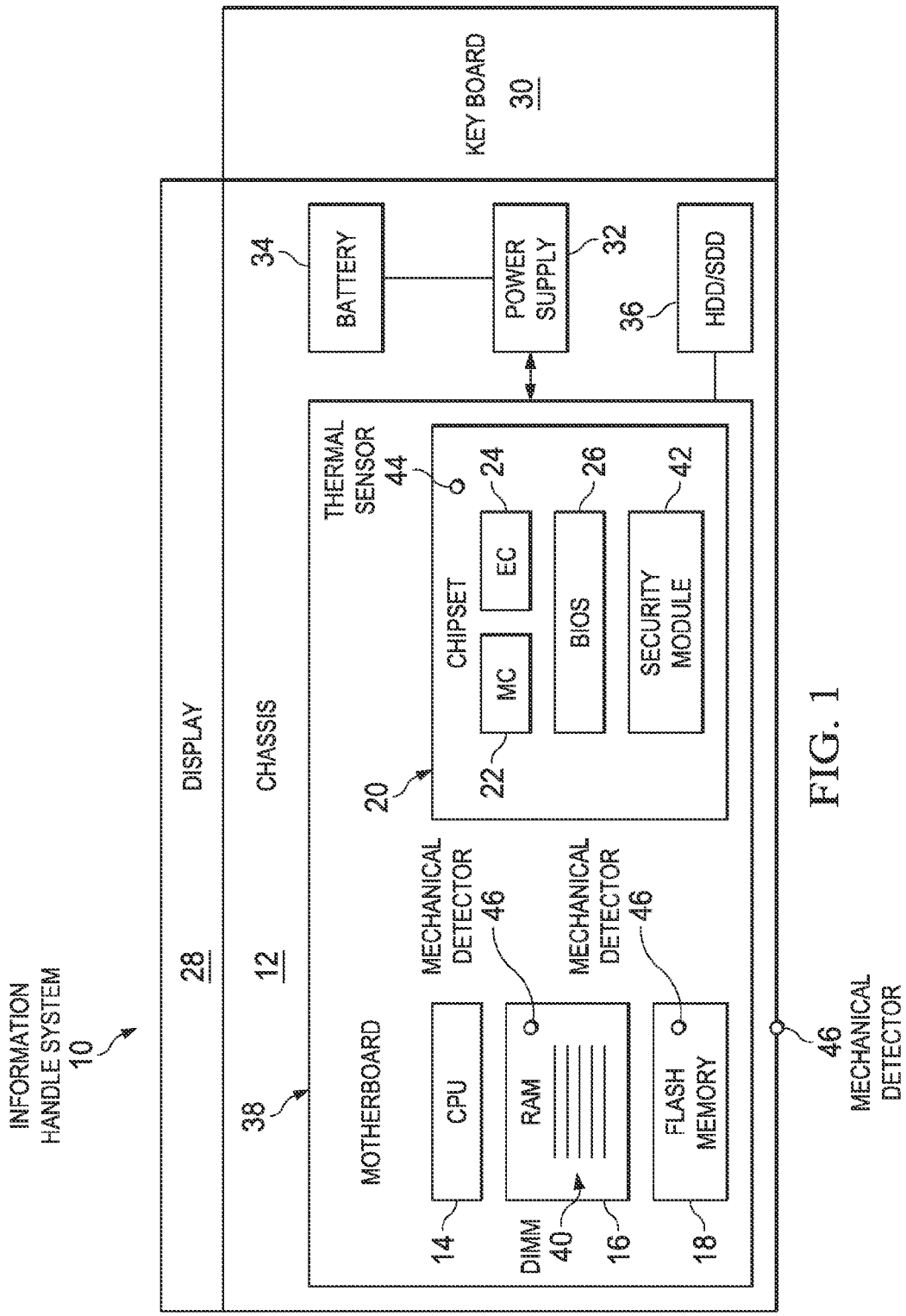
FIG. 1 depicts a block diagram of an information handling system providing secret protection with dispersal of secrets across plural memory devices.

Referring now to FIG. 1, a block diagram depicts an information handling system 10 providing secret protection with dispersal of secrets across plural memory devices. Information handling system 10 processes information with components disposed in a chassis 12. For example, a central processing unit CPU 14 process information by executing instructions of an application running over an operating system, such as a web browser executing over a WINDOWS, LINUX or ANDROID operating system. CPU 14 executes instructions to process information by storing the instructions and information in memory accessible by the operating system, such as RAM 16 and/or flash memory 18. The operating system maps virtual memory "pages" to physical memory devices under the management of firmware executing on a chipset 20, such as firmware executing on a memory controller 22 and/or embedded controller 24. In various embodiments, mapping of memory between operating system pages and physical memory devices is managed separately or in combination with BIOS 26 or other types of hardware management modules. The present disclosure leverages existing memory mapping schemes to accomplish increased security for sensitive information stored in memory accessible by the operating system. Information handling system 10 processes information with user inputs and provides output to users with a variety of I/O devices, such as an integrated display 28 that presents information as visual images and accepts touch inputs, and a keyboard 30 that accepts keyed inputs through either a physical connector or wireless interface.

During normal operations, information handling system 10 operates processing components with power provided from a power supply 32 or a battery 34 that is charged by power supply 32. Initially, information handling system 10 boots with instructions from BIOS 26 or other initialization firmware that, in turn, retrieves an operating system from nonvolatile memory, such as a hard disk drive (HDD) or solid state drive (SSD) 36 to RAM 16 through a communication interface integrated within a motherboard 38. In the example embodiment, the operating system is retrieved to dual in-line memory modules (DIMMs) and executed on CPU 14. In alternative embodiments, the operating system may run on a "unified" memory that includes plural flash memory modules 18 that work with or are included in an SSD 36. Alternatively, the operating system may be divided between DIMMs 40 and flash memory 18 with various portions of operating system information stored in various memory types to enhance system boot time, etc.

In a cold boot attack, an unauthorized user attempts to capture the operating system post-boot from memory, such as DIMMs 40, and then access the stored operating system information by placing it into a different information handling system. One technique for a cold boot attack is to cool down DIMMs 40 in a freezer or with a cooling airflow, physically remove DIMMs 40 from motherboard 38, and load DIMMs 40 into a separate information handling system to reboot without protection for sensitive information accessed by the operating system. Other types of cold boot attacks rely on tricking the information handling system to maintain an active operating system in memory with sensitive information exposed and accessible to a different information handling system, such a initializing a boot from an external storage device. Once the memory that stores the active operating system is under the control of a different information handling system, access to sensitive information in the memory becomes possible.

In order to reduce the risk of a cold boot attack, a security module 42 executing on processing resources of chipset 20 detects sensitive information exposed by the operating system and protects the sensitive information from access by removal of a memory device from information handling system 10. For example, security module 42 identifies sensitive information as information decrypted by the operating system for use in processing and passwords maintained by the operating system to decrypt the information. For instance, decrypted information may include information retrieved through a web browser secure interface and the passwords used by the web browser, word processing and other documents encrypted by a key, VPN connections and similar secure information. In alternative embodiments, alternative criteria may be used to determine secure information based upon user preferences related to overhead resources and time needed to manage security. For example, in one embodiment, all information may be treated as secure information with the security steps described herein performed on each transition into an S3 power down state that maintains power to the DIMMs. Alternatively, a more limited definition of secure information allows for active tracking of that information as the system operates so that fewer operations are performed at transition to an S3 state.

Security module 42 protects sensitive information stored in DTMMs 40 or other memory devices by encrypting sensitive information and breaking the key and/or encrypted information into portions split between the DIMMs 40 or other memory devices. Security module 42 cooperates with memory controller 22 and/or embedded controller 24 to map encrypted sensitive information portions and/or key portions to different physical memory locations, such as different DIMMs 40. In this manner, removal of a single DIMM 40 will not contain all of the secret information needed to provide access to operating system sensitive information. Security module 42 then monitors information handling system 10 for indications of removal of a DIMM 40 or other memory device and, upon detection of such an indication, clears the remaining DIMMs 40 of sensitive information before a complete set of the sensitive information is removed by removal of all DIMMs 40 that store the sensitive information. Security module 42 determines an indication of an unauthorized memory device removal in a number of different ways. In one embodiment, detection of a reduced temperature by a thermal sensor 44 triggers security module 42 to erase sensitive information. In another embodiment, detection of an opening of chassis 12 or removal of a DIMM 40 by activation of a mechanical detector 46 triggers security module 42 to erase sensitive information. In another alternative embodiment, detection of changed electrical characteristic at motherboard 38, such as a change of impedance, resistance, capacitance or ground interactions, triggers erasure of the sensitive information. In yet another alternative embodiment, security module 42 cooperates with embedded controller 24 or other hardware device to periodically poll DIMMs 40 and detects an indication of removal if a DIMM 40 fails to respond to a poll. If only sensitive information is deleted, then information handling system 10 will still allow a re-boot from an S3 state for the convenience of a legitimate user while requiring re-inputting of passwords. If desired for additional security, a complete deletion of operating system information may be performed, such as by cleansing RAM 16, flash memory 18 or other memory devices involved in supporting the operating system.

The above-described enhanced security may be enforced when information handling system 10 is powered to an on state or may be initiated with entry to a reduced power state, such as an ACPI S3 state that maintains RAM 16 powered on. In one embodiment, as an end user enters a key or password, security module 42 coordinates breaking the key or password into multiple portions and sending the multiple portions to multiple memory devices. In another embodiment, security module 42 gathers sensitive information as the operating system uses the sensitive information, encrypts the sensitive information in one "blob" file, then sends portions of the blob file and the key to decrypt the blob file to different memory devices. The operating system may either retrieve the sensitive information as needed by decrypting the blob, or may keep the sensitive information unencrypted distributed in multiple memory locations. In such an embodiment, the unencrypted sensitive information is deleted upon transition to an S3 power state so that the operating system may use the blob to re-boot to the S1 power state when requested by the user.

Figure 2:
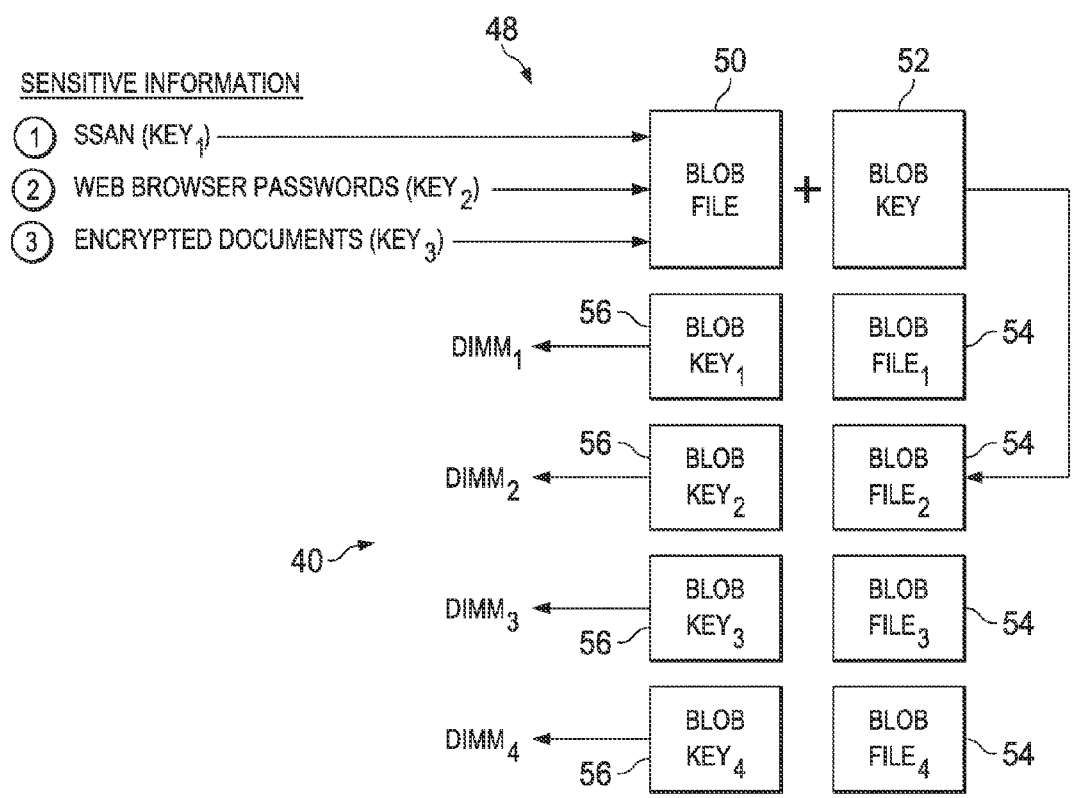
FIG. 2 depicts a flow diagram of information dispersal to plural memory devices for enhanced secret protection.

Referring now to FIG. 2, a flow diagram depicts information dispersal to plural memory devices for enhanced secret protection. The process starts at step 48 with gathering of sensitive information, depicted in the example as a social security account number, web browser passwords and encrypted documents, each stored in non-volatile memory and protected by a key. At step 50, the sensitive information is combined into a blob file, such as a comma separated variable file or other format. At step 52, a blob key is used to encrypt the blob file and then maintained in plain form for use by the operating system. At step 54, the blob file and block key are split into the same number of portions as the number of DIMMs 40 in the information handling system. At step 56, the blob file and blob key portions are stored on separate DIMMs 40. Although the example embodiment depicts breaking sensitive information into even portions and dispersing the sensitive information across all available DIMMs 40, in alternative embodiments different sized blobs or portions may be sent to different memory devices, including flash memory devices, with some memory devices not used to store the sensitive information. As described above, the process depicted by FIG. 2 may involve distribution of sensitive information portions to multiple memory devices without encryption or gathering into a "blob" combined format. For example, a social security account number might be protected by splitting into two portions of five numbers each as sending the portions to two different memory devices.

Figure 3:
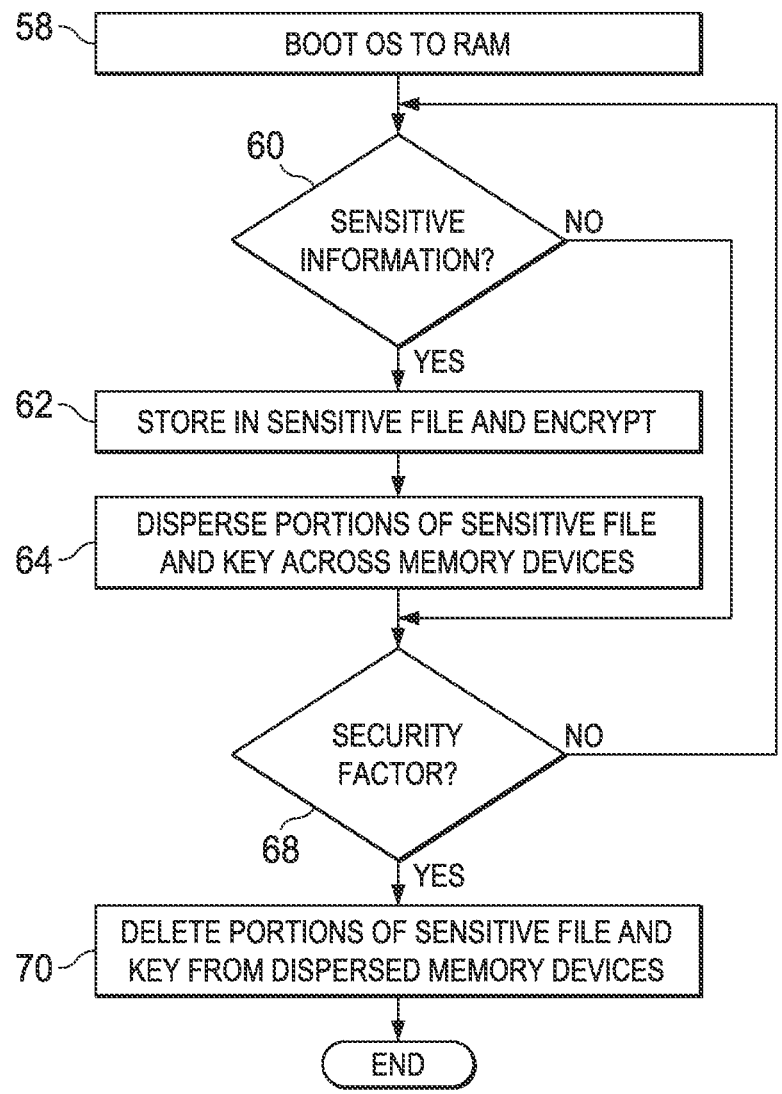
FIG. 3 depicts a flow diagram of a process for protecting sensitive information stored on an information handling system.

Referring now to FIG. 3, a flow diagram of a process for protecting sensitive information stored on an information handling system. At step 58, the process starts with a boot of an operating system from non-volatile storage to volatile storage, such as RAM. At step 60, a determination is made of whether sensitive information is included in the information stored in RAM, such as passwords or sensitive personal information. If yes, the process continues to step 62 to store the sensitive information in a designated sensitive file and encrypt the sensitive file. At step 64, the sensitive file and key is broken into plural portions and the portions are dispersed across plural memory devices. In this state, the operating system can either maintain a separate set of the sensitive information that is deleted on transition to an S3 state or decrypt the sensitive file when sensitive information is needed. At step 68, a determination is made of whether a security factor is detected that indicates an attempt at unauthorized access to the sensitive information. If not, the process returns to step 60 to continue monitoring whether sensitive information exists in memory. If at step 68 a security factor is detected, the process continues to step 70 to delete the portions of the sensitive information and key from the dispersed memory devices. Deletion of sensitive portions may be directed to specifically-identified sensitive information or more broadly to all information stored in memory. Although deleting all information stored in memory provides increased security, it may result in delays if an authorized access did not take place and an end user desires to re-boot from S3 to an on state.

Although the present invention has been described in detail, it should be understood that various changes, substitutions and alterations can be made hereto without departing from the spirit and scope of the invention as defined by the appended claims.

What is claimed is:

1. An information handling system comprising:
   a chassis;
   a processor disposed in the chassis and operable to process information;
   memory disposed in the chassis and interfaced with the processor, the memory operable to store the information, the memory having at least first and second separate memory devices, the first and second memory devices comprising at least first and second random access memory (RAM) modules;
   a memory controller interfaced with the memory and operable to manage locations in the memory devices to store the information; and
   a security module interfaced with the memory controller, the security module operable to identify sensitive information based upon predetermined conditions and to locate first and second portions of the sensitive information on the first and second memory devices;
   wherein:
   the first portion comprises less than all of an encrypted file having encrypted information and less than all of a password to decrypt the encrypted information; and
   the second portion comprises less than all of the encrypted file and less than all of the password to decrypt the encrypted information.

2. The system of claim 1 wherein:
   the first and second memory devices comprise first and second RAM modules; and
   the security module is further operable to delete the second portion if a predetermined condition associated with the first portion is detected.

3. The system of claim 2 wherein the predetermined condition associated with the first portion comprises a predetermined temperature.

4. The system of claim 2 wherein the predetermined condition associated with the first portion comprises an altered electrical characteristic associated with removal of the first memory device.

5. The system of claim 2 wherein the predetermined condition associated with the first portion comprises a signal from a mechanical device, the signal triggered by removal of the first memory device.

6. The system of claim 1 wherein the predetermined conditions comprise transition to an S3 sleep power state.

7. The system of claim 6 wherein the sensitive information comprises passwords stored in a web browser, the passwords stored in an encrypted file upon detection of transition to S3 power state, the encrypted file broken into at least the first and second portions for storage on the first and second memory devices.

8. A method for information handling system secret protection across plural random access memory (RAM) devices, the method comprising:
   defining sensitive information stored in memory of an information handling system, the sensitive information including at least a key for decrypting the sensitive information, the key having first and second portions;
   storing a first portion of the sensitive information in a first of the plural RAM devices of the information handling system, the first portion including the first portion of the key;
   storing a second portion of the sensitive information in a second of the plural RAM devices of the information handling system, the second portion including the second portion of the key;
   detecting transition of the information handling system to an S3 reduced power state;
   detecting a predetermined condition associated with the first of the plural RAM devices; and
   in response to the detecting the predetermined condition, deleting the second portion from the second memory device.

9. The method of claim 8 wherein:
   the storing the first portion in the first of the plural RAM devices and the storing the second portion in the second of the plural RAM devices, is performed in response to the detecting transition.

10. The method of claim 8 wherein the predetermined condition comprises a temperature threshold.

11. The method of claim 8 wherein the predetermined condition comprises an indication of removal of the first RAM device.

12. The method of claim 8 wherein the sensitive information comprises passwords stored in RAM by the operating system for accessing encrypted information.

13. The method of claim 8 wherein the predetermined condition further comprises a failure by the first RAM memory module to respond to a periodic poll by the memory controller.

14. A system for secret protection across plural RAM memory modules of an information handling system, the system comprising:
   a memory controller operable to map information for storage on the plural RAM memory modules; and
   a security module interfaced with the memory controller, the security module operable to map plural portions of predetermined sensitive information for storage across the plural RAM memory modules and to delete the plural portions upon detection of a predetermined security factor;

wherein the plural portions of predetermined sensitive information comprises an encrypted blob of plural files broken into the plural portions; and wherein the plural portions of predetermined sensitive information comprises a key that decrypts the encrypted blob, the key broken into the plural portions.

15. The system of claim 14 wherein the predetermined security factor comprises an indication of removal of one or more of the plural RAM memory modules from the information handling system.

* * * * *